(12) United States Patent
Clark

(10) Patent No.: US 7,436,183 B2
(45) Date of Patent: *Oct. 14, 2008

(54) REPLACEABLE ANTENNAS FOR WELLBORE APPARATUS

(75) Inventor: Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 132 days.

This patent is subject to a terminal disclaimer.

(21) Appl. No.: 10/260,098

(22) Filed: Sep. 30, 2002

(65) Prior Publication Data

US 2004/0061622 A1 Apr. 1, 2004

(51) Int. Cl.
*G01V 3/18* (2006.01)

(52) U.S. Cl. .................... 324/338; 324/343

(58) Field of Classification Search .......... 324/338, 324/339, 343, 333, 346, 351, 355, 368
See application file for complete search history.

(56) References Cited

U.S. PATENT DOCUMENTS

| | | |
|---|---|---|
| 4,689,572 A | 8/1987 | Clark |
| 4,704,581 A | 11/1987 | Clark |
| RE32,913 E | 4/1989 | Clark |
| 4,899,112 A | 2/1990 | Clark et al. |
| 4,949,045 A | 8/1990 | Clark et al. |
| 4,968,940 A | 11/1990 | Clark et al. |
| 5,138,263 A | 8/1992 | Towle |
| 5,233,304 A | 8/1993 | Hubans |
| 5,235,285 A | 8/1993 | Clark et al. |
| 5,530,358 A | 6/1996 | Wisler et al. |
| 5,644,231 A | 7/1997 | Wignall |
| 5,661,402 A * | 8/1997 | Chesnutt et al. ............. 324/338 |
| 5,939,885 A | 8/1999 | McClure et al. |
| 5,977,768 A | 11/1999 | Sezginer et al. |
| 6,100,696 A * | 8/2000 | Sinclair .................... 324/339 |
| 6,255,817 B1 | 7/2001 | Poitzsch et al. |
| 6,297,639 B1 | 10/2001 | Clark et al. |
| 6,351,127 B1 | 2/2002 | Rosthal et al. |
| 6,380,744 B1 | 4/2002 | Clark et al. |
| 6,476,609 B1 * | 11/2002 | Bittar ....................... 324/338 |
| 6,788,263 B2 * | 9/2004 | Clark et al. ................ 343/719 |
| 2002/0008521 A1 * | 1/2002 | Clark et al. ................ 324/338 |
| 2002/0105332 A1 * | 8/2002 | Rosthal et al. ............. 324/338 |
| 2002/0186013 A1 * | 12/2002 | Tabarovsky et al. ........ 324/343 |

* cited by examiner

*Primary Examiner*—Patrick Assouad
*Assistant Examiner*—David M. Schindler
(74) *Attorney, Agent, or Firm*—Bryan L. White; Dorla Fonseca; Brigitte Echols

(57) ABSTRACT

An antenna structure is separately and independently formed with respect to a downhole tool. The antenna is adapted for easy and rapid deployment on the tool. An independently formed 'partial ring section' (or arcuate shaped member) contains an antenna coil. In one embodiment, two or more of the independently formed partial ring sections are placed in a recess on the tubular forming the downhole tool. In another embodiment, the partial ring sections can also be placed in one or more longitudinally distributed sections about the tool. Another embodiment includes partial ring sections forming an antenna with multiple coils of differing orientation to provide directional sensitivity.

21 Claims, 13 Drawing Sheets

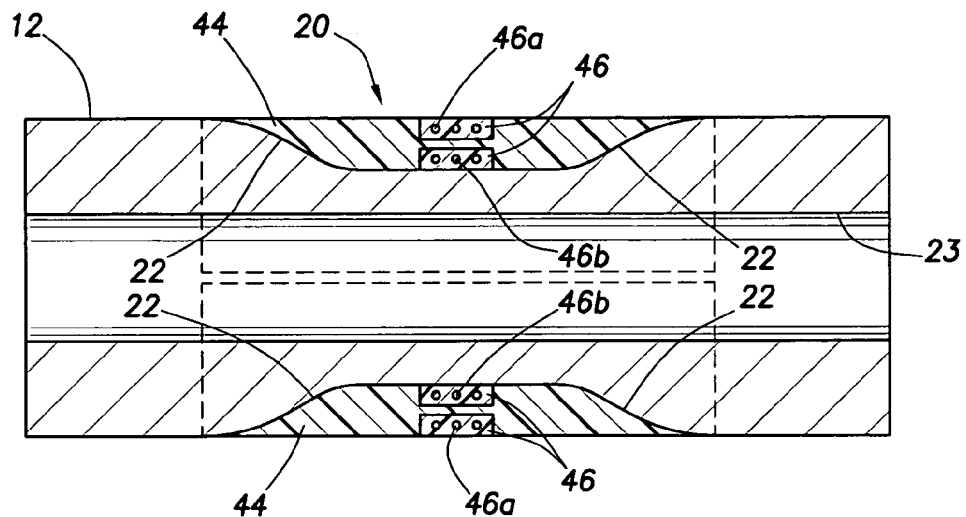
FIG. 8
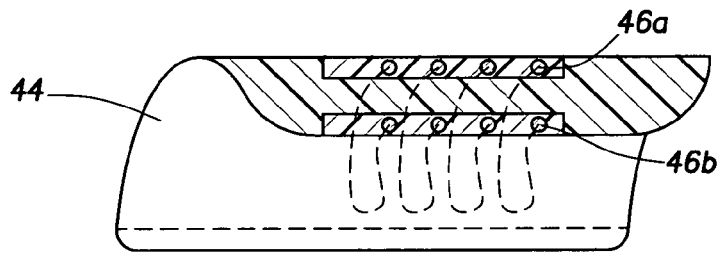
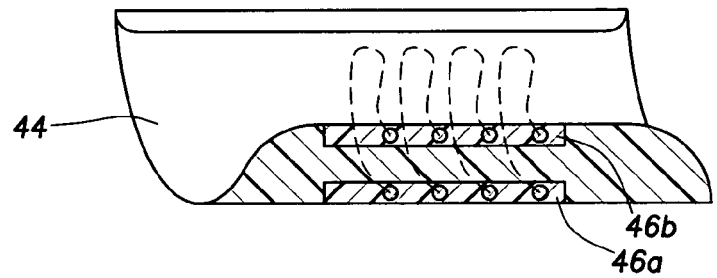
FIG. 9
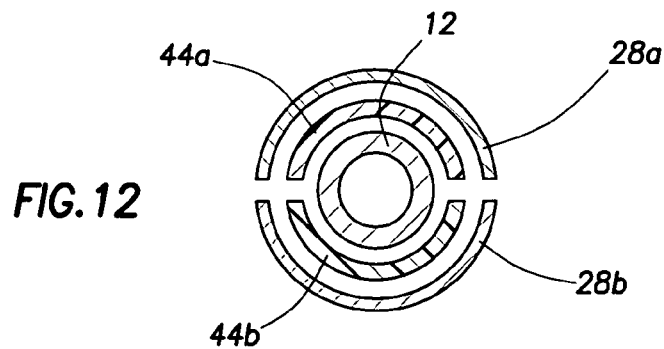
FIG. 12

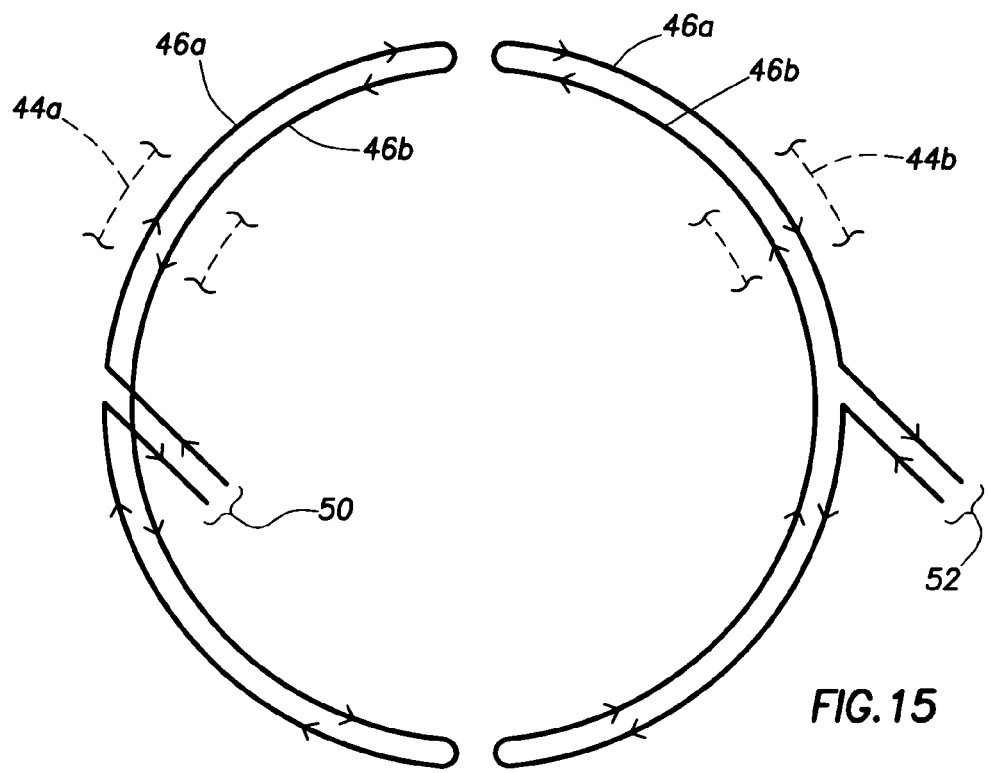
FIG.15
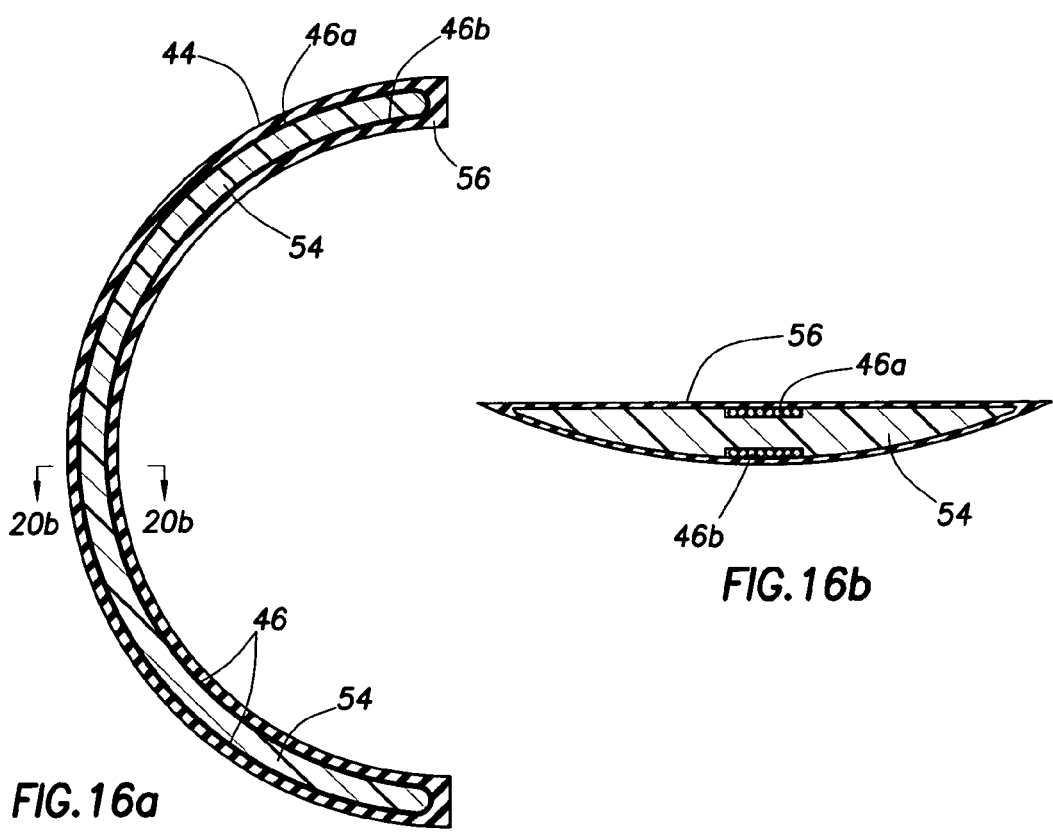
FIG.16a
FIG.16b

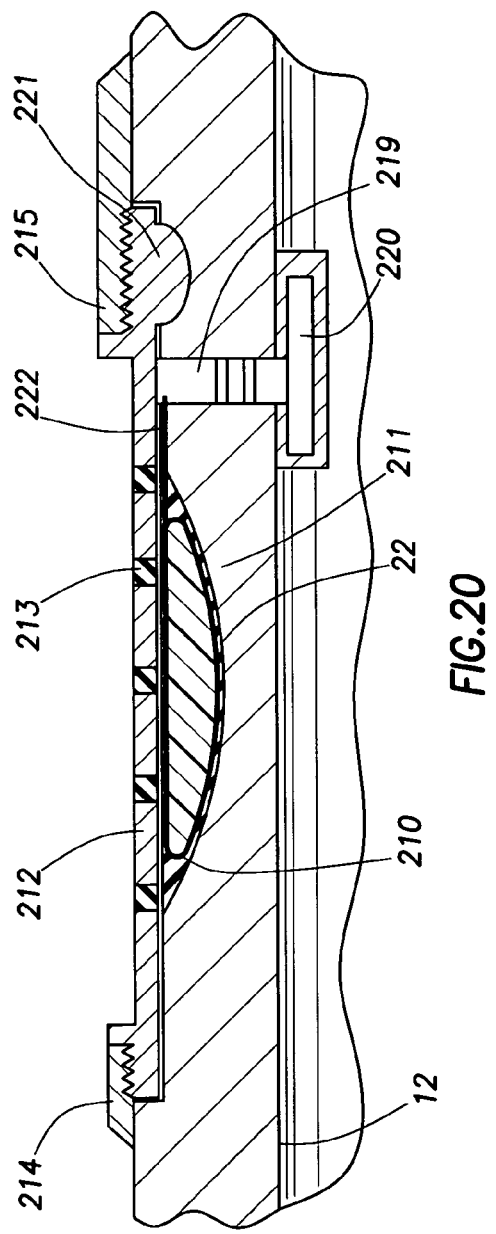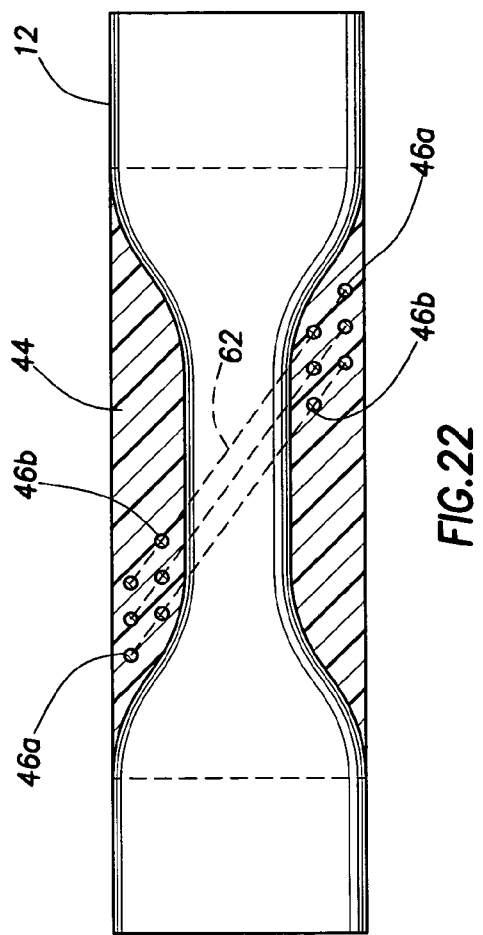

REPLACEABLE ANTENNAS FOR WELLBORE APPARATUS

BACKGROUND OF THE INVENTION

1. Field of the Invention

The present invention relates to wellbore apparatus, such as Logging While Drilling (LWD) and wireline logging apparatus, and, in particular, to replaceable and slide-on antennas for such wellbore apparatus. It is also applicable to electromagnetic telemetry used in Measurement While Drilling (MWD) and LWD operations.

2. Description of Related Art

Wellbore tools used downhole include Directional Drilling Systems such as MWD and LWD systems. FIG. 1 shows a conventional LWD system comprising a bottom hole assembly that includes a telemetry section 10, an LWD collar 12 also known as a "drill collar" 12, a positive displacement motor (PDM) 14, a bent sub 16, and a drill bit 18. The drill collar 12 typically includes a plurality of antennas 20 mounted thereon, the antennas 20 generally include at least one transmitter antenna 20a and at least one receiver antenna 20b. The transmitter(s) and receiver(s) each comprise loop antennas consisting of a plurality of wire turns forming a coil. These transmitter 20a and receiver 20b antennas are placed around the drill collar 12. The LWD system is used to measure subsurface properties such as formation resistivity, formation porosity, formation density, or the natural formation radioactivity. The LWD apparatus is similar to a standard wireline logging suite, except that it is incorporated into a drill collar of the LWD system.

An LWD resistivity tool measures the resistivity of the earth formation by emitting, from the transmitter, electromagnetic energy that propagates through the formation. The receiver receives the electromagnetic energy propagating in the formation and, responsive thereto, the phase and the amplitude of the electromagnetic energy are measured. When two receivers are employed, the phase shift and attenuation of the electromagnetic energy are measured between the receivers and the resistivity of the formation is deduced from the aforementioned phase shift and attenuation. In common practice, most LWD resistivity tools use electromagnetic energy in the frequency range of hundreds of kilohertz to a few megahertz. A typical distance between a transmitter and receiver is generally less than one meter because of the high rate of attenuation of high frequency electromagnetic waves in many subsurface formations.

Electromagnetic energy is also used for short-range communication between downhole systems when it is difficult to establish a direct-wired connection. For example, sensors can be placed in a small sensor sub located near the drill bit; where the sensors measure the borehole inclination and/or formation properties. If a positive displacement mud motor is used, then running an electrical wire from the sensor sub, through the mud motor, and to the MWD system is difficult. An electromagnetic antenna can be placed on the sensor sub to transmit data to the MWD system by transmitting electromagnetic energy. A similar electromagnetic antenna placed in the MWD system receives the transmitted energy and subsequently transmits the data to the surface via mud pulse telemetry. An apparatus using such a technique is described in U.S. Pat. No. 6,057,784. These electromagnetic antennas can be loop antennas similar to those used for measuring formation resistivity. However, typical frequencies used in downhole electromagnetic telemetry systems tend to be in the range of a few kilohertz to tens of kilohertz. The lower frequencies are required to transmit electromagnetic energy distances of tens of meters between the downhole tools. The higher frequency electromagnetic energy used in most LWD resistivity tools might be too attenuated in low resistivity formations. Hence, details of the low frequency antennas (such as the number of turns) can be different from the high frequency antennas.

Conventional manufacturing processes for placing the loop antennas on downhole tools, such as the drill collar 12 of the LWD system, involve disposing one or more grooves in the drill collar. A layer of fiberglass epoxy is disposed in each of the grooves, the fiberglass epoxy layer is cured, and then the layer of fiberglass epoxy is machined. A coil is then placed or grafted over the top of the machined and cured fiberglass epoxy layer in each of the grooves to produce one or more multi-turn coils in each of the grooves. A second fiberglass epoxy layer is placed over each of the multi-turn coils and a layer of rubber is placed over the second fiberglass epoxy layer. These techniques are described in U.S. Pat. No. 4,949,045 (assigned to the present assignee). A shield is typically mounted over the rubber layer, the shield including a plurality of slots to allow for the passage of electromagnetic energy.

This manufacturing process is relatively expensive and time consuming. There are basically six steps in the process: (1) put the first layer of fiberglass epoxy down and cure that layer, (2) machine that layer, (3) wind the coil, (4) put another layer of fiberglass epoxy down, cure and machine that layer, (5) put a layer of rubber over the last aforementioned layer, and (6) cure that layer, and machine the rubber. Therefore, if a loop antenna of a receiver or transmitter, which is mounted on a downhole tool, is damaged in the field, the entire tool (that is, the entire drill collar of the LWD tool) must be sent back to a central repair facility. This requires fairly large pieces of equipment and several cycles, taking many weeks to complete the process in a repair operation. In short, there is a slow turn-around process in connection with the manufacture and/or repair of the loop antennas that comprise the transmitters and receivers of typical downhole tools.

FIGS. 2a-2d show conventional antenna configurations on a drill collar 12. The antennas are wrapped around the collar in a recess 22 and oriented in different directions. In FIG. 2a, an axial coil 26 is formed of one or more loops of wire where each loop of wire lies in a plane essentially perpendicular to the axis of the drill collar. Each loop is essentially circular and centered around the drill collar 12. The orientation of the coil is indicated by the dashed arrow 201, which is perpendicular to the plane of the coil and coincident with the axis of the drill collar. The well known "right hand rule" of electromagnetic theory for determining the direction of the magnetic field for a coil carrying a current "I" can be used to determine the direction of the arrow (i.e. up or down in the FIG.). The purpose of such an axial antenna acting as a transmitter is to produce a magnetic field parallel to the axis of the drill collar. Similarly, such an axial antenna acting as a receiver will detect a magnetic field parallel to the axis of the drill collar.

In FIG. 2b, the antenna coil 62 is wrapped around the recess 22, but the plane of an individual loop is not perpendicular to the axis of the drill collar. The orientation of this coil is perpendicular to the plane of the loop, and illustrated by the arrow 202. This will be referred to as a diagonal coil, since the orientation 202 of the coil 62 is diagonal with respect to the axis of the drill collar. In this case, each loop of the coil has an approximately elliptical shape centered on the axis of the drill collar. The purpose of such a diagonal antenna coil acting as a transmitter is to produce a magnetic field diagonal to the axis of the drill collar, with the magnetic field direction indicated by the dashed arrow 202. Similarly, such a diagonal antenna acting as a receiver will detect a magnetic field diagonal to the axis of the drill collar, in the direction indicated by the dashed arrow 202.

In FIGS. 2c and 2d, two transverse antenna coils 210 are placed on opposite sides in the recess 22 of the drill collar 12 (FIG. 2d is a view rotated by 90° from FIG. 2c). Each transverse antenna 210 consists of one or more loops of wire where the plane of a loop is essentially parallel to the drill collar axis and intersects the drill collar axis. The orientation of a transverse coil is illustrated by the dashed arrows 203. If the two transverse loops are wired in series such that the direction of current is the same in both coils (i.e. counter-clockwise in FIG. 2c), then the two transverse coils have the same orientation. The purpose of such transverse antennas acting as a transmitter is to produce a magnetic field transverse or perpendicular to the axis of the drill collar, with the magnetic field direction indicated by the dashed arrow 203. Similarly, such transverse antennas acting as a receiver will detect a magnetic field transverse to the axis of the drill collar, in the direction indicated by the dashed arrow 203.

Since conventional loop antennas include a plurality of coil forms wrapped around the tool, it would be advantageous to be able to manufacture the coil forms separately and independently from the tool. With this capability one need only replace the damaged or faulty antenna in the field instead of sending the entire drill collar back to the central repair facility. This capability is especially important since such equipment is used around the world, and shipping heavy equipment into or out of some remote locations or countries is very difficult, time consuming, and costly.

Thus a need remains for improved techniques for constructing antennas separately and independently from downhole tools and for deploying such antennas on the tools.

SUMMARY OF THE INVENTION

The invention provides an arcuate shaped member adapted to function as an antenna. The member includes a curved shaped section, the curved shape of the section adapted to be placed in juxtaposition with another curved shaped section; and a coil disposed in the curved shaped section of the arcuate shaped member, the coil having a primary path and a return path.

The invention provides an apparatus adapted for disposal within a wellbore. The apparatus includes a tubular having an elongated section with a recess formed therein; at least one arcuate shaped member adapted for disposal within the tubular recess, the arcuate shaped member being independently formed with respect to the tubular; and the arcuate shaped member having a coil disposed therein.

The invention provides a method of deploying an antenna on a wellbore tool, the tool including a recess formed therein. The method includes disposing at least two arcuate shaped members within and in juxtaposition with the tool recess, the arcuate shaped members each being independently formed with respect to the tool, the arcuate shaped members each including a coil disposed therein; and coupling an electrical source to the coils.

BRIEF DESCRIPTION OF THE DRAWINGS

FIG. 8 illustrates an embodiment of a loop antenna in accord with the invention, taken along section lines 12-12 of FIG. 7, where the antenna includes two 'partial ring sections' which are disposed in a recess or groove in a drill collar and are juxtaposed together to form two antenna coils.

FIG. 9 illustrates a more detailed construction of one 'partial ring section' of FIG. 8 (taken along section lines 12-12 of FIG. 7, but without the drill collar).

FIG. 12 illustrates a cross section through the drill collar of FIG. 11 taken along section lines 17-17 of FIG. 11.

FIGS. 14 and 15 illustrate antenna coils embedded in ring shaped arcuate members of the invention.

FIG. 16a illustrates one 'partial ring section' shown in a side view, the partial ring section being shaped in the form of a 'half cylinder', the partial ring section including one antenna coil embedded in a fiberglass epoxy compound.

FIG. 16b illustrates a cross-sectional view of the 'partial ring section' of FIG. 16a taken along section lines 20b-20b of FIG. 16a.

FIG. 20 is a cross-sectional view showing the partial ring section, transverse antenna, and electronics disposed in a drill collar in accord with the invention.

FIG. 22 illustrates a loop antenna with shield including a 'diagonal' (as opposed to an axial) antenna coil configuration in accord with the invention.

DETAILED DESCRIPTION

Figure 1:
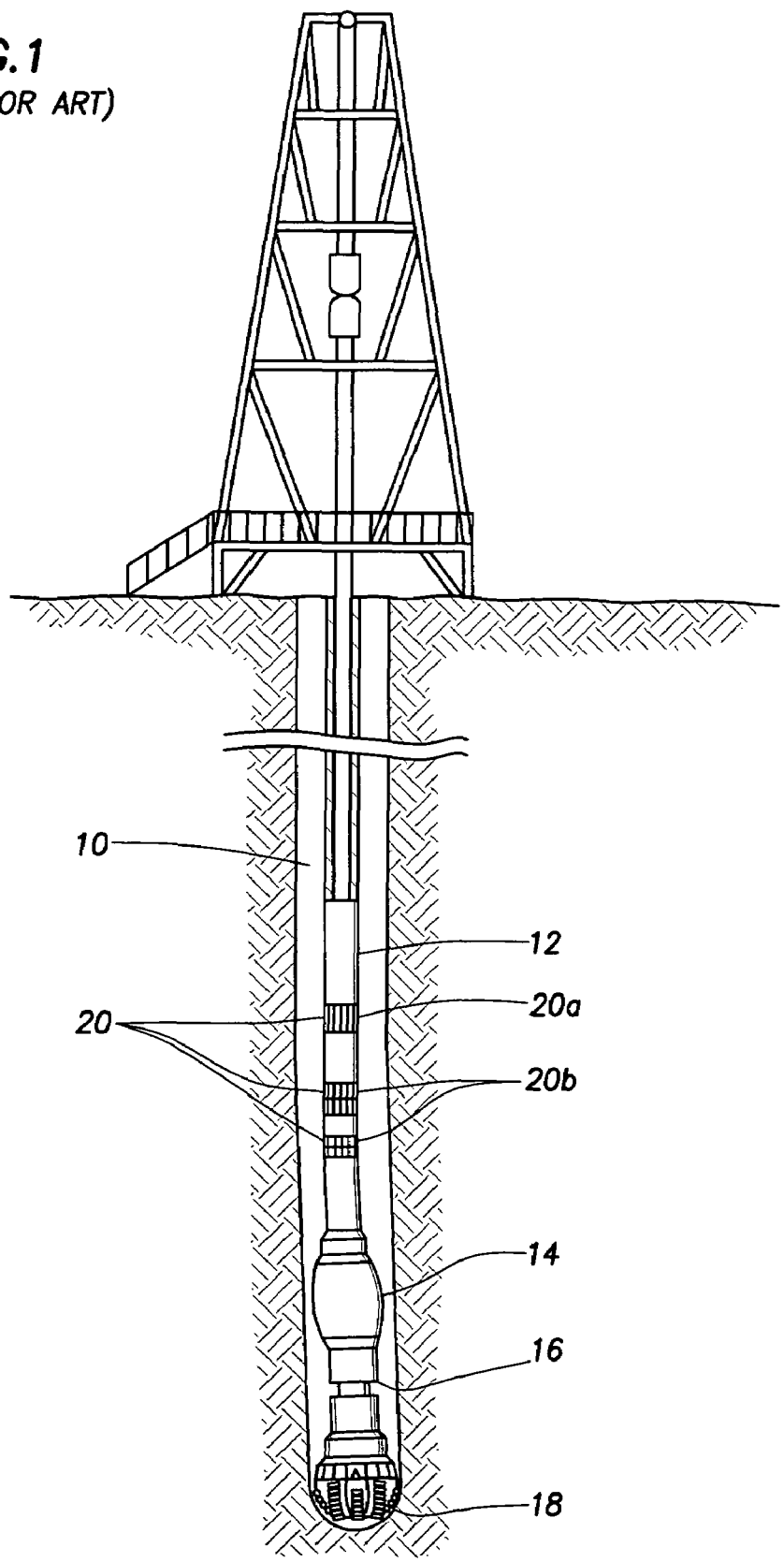
FIG. 1 illustrates a conventional LWD bottom hole assembly.
Figure 2D:
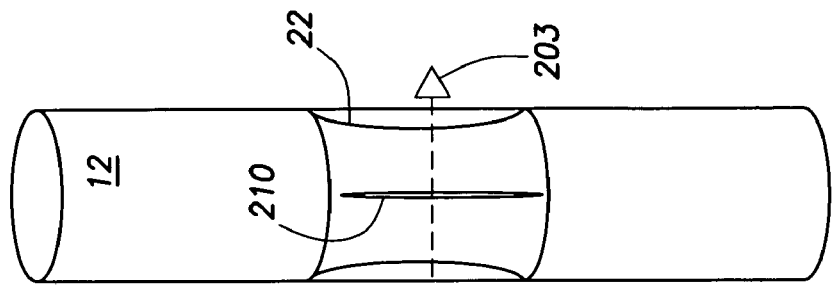
FIGS. 2a-2d illustrate conventional antenna configurations used on downhole tools. Axial, diagonal, and transverse configurations are respectively shown.
Figure 2C:
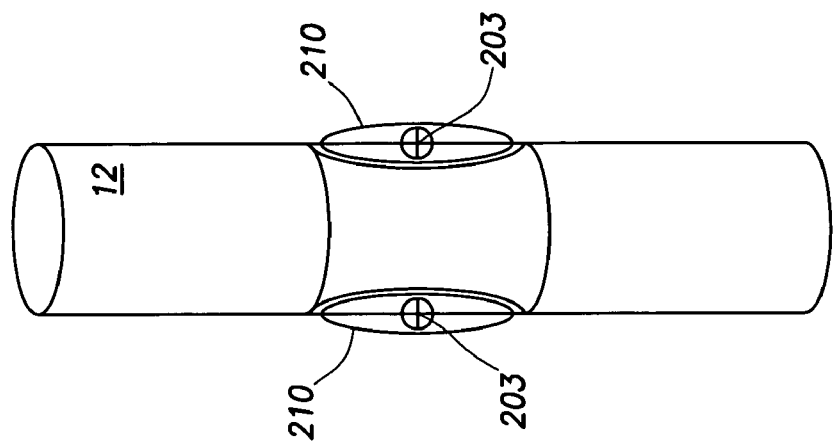
Figure 2B:
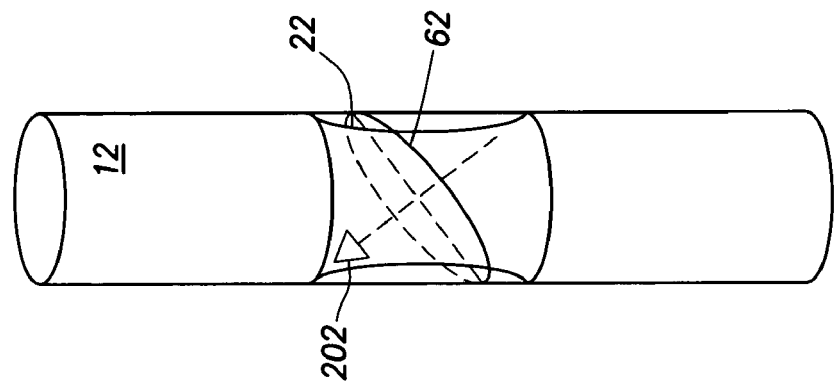
Figure 2A:
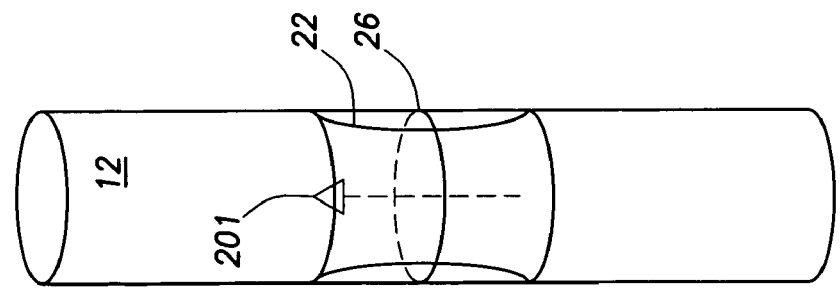
Figure 3:
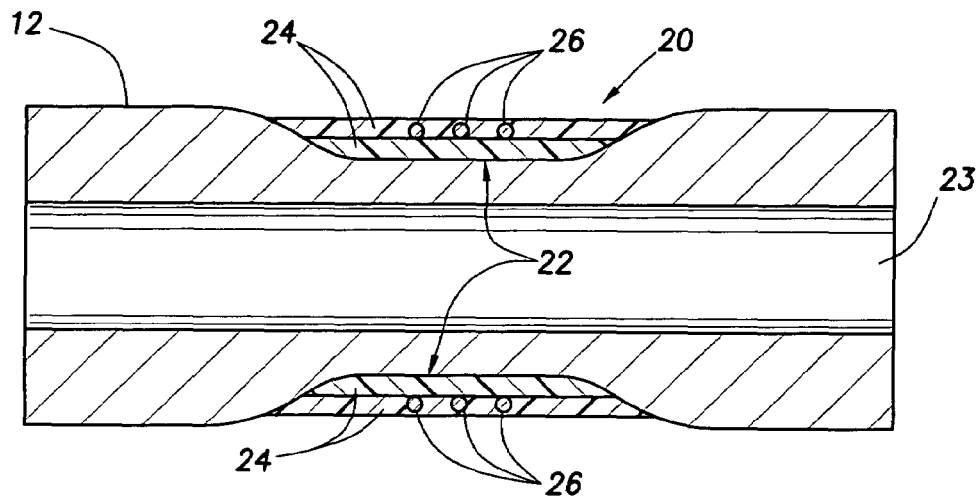
FIGS. 3 and 4 illustrate a conventional axial loop antenna wrapped around a drill collar.

FIG. 3 shows a cross-sectional view of an antenna 20 on the drill collar 12 of FIG. 1. A portion of the drill collar 12 is illustrated, including an antenna 20 (either the transmitting antenna 20a or the receiving antenna 20b). The collar 12 includes an inner bore 23 to allow for the passage of drilling fluid or "mud." A recess or groove 22 is formed in the drill collar 12. A first layer of fiberglass epoxy is deposited in the recess 22, cured and machined. An antenna coil 26 is then wrapped or grafted over the top of the machined and cured fiberglass epoxy layer in a spiral fashion. A second layer of fiberglass epoxy is then deposited in the recess 22. The first and second fiberglass layers are indicated by numeral 24. A layer of rubber is also placed over the second fiberglass epoxy layer (not shown in FIG. 3). A shield is typically mounted over the top of the rubber layer to protect the antenna during downhole disposal. In actuality, one or more grooves or recesses 22 are longitudinally disposed about the drill collar 12, each including fiberglass and rubber layers with coil antennas disposed therein.

FIG. 3 shows only a few turns of wire that comprises the coil, which is typical for an LWD resistivity tool that operates in the general frequency range of 100 kilohertz to a few megahertz. At these frequencies, 5 to 20 turns of wire can provide a sufficient level of efficiency for the resistivity measurement. If the antenna is used for electromagnetic telemetry, and has an operating frequency range of a few kilohertz to a few tens of kilohertz, then several hundred turns of wire may be needed to produce a sufficient level of efficiency. Otherwise, the antenna properties (such as physical dimensions) can be similar for the two situations. In the following discussion, it should be understood that it can be applied to either situation, with the number of turns possibly differing depending on use.

Figure 4:
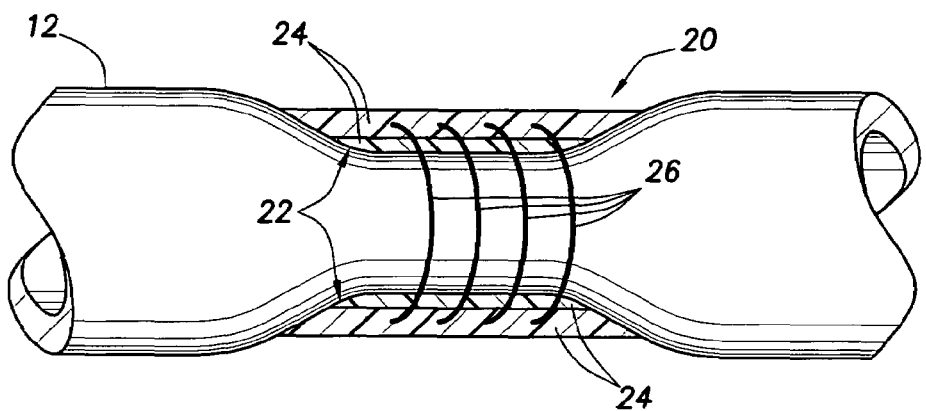

FIG. 4 shows an antenna 20 on the drill collar 12, further illustrating the first and second layers of fiberglass epoxy 24. The antenna coil 26 is shown spirally wrapped around the recess 22 in the drill collar 12.

Figure 5:
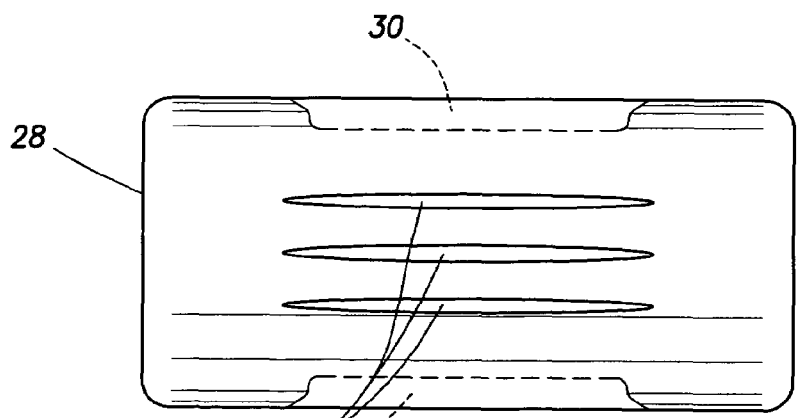
FIG. 5 illustrates a conventional shield adapted for disposal around loop antennas.
Figure 6:
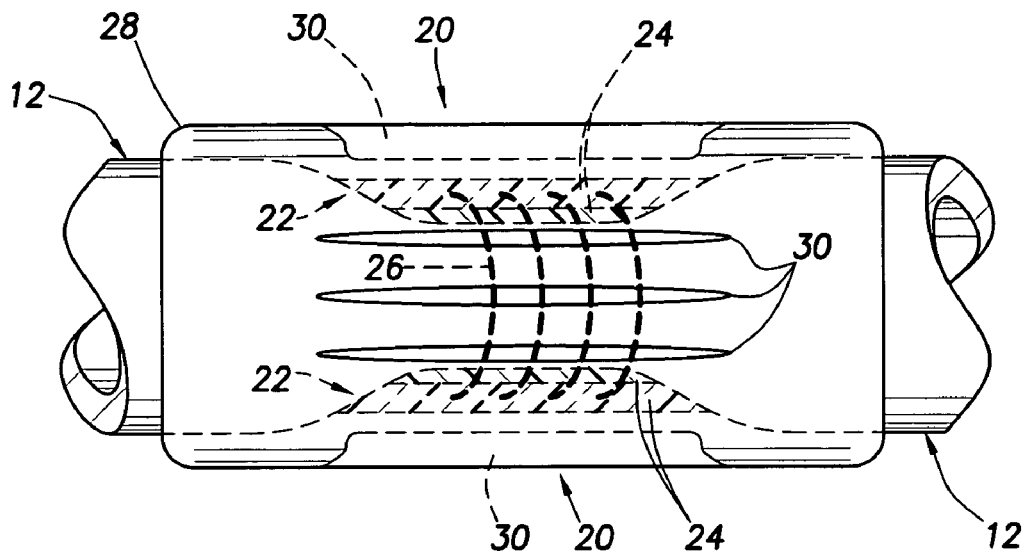
FIG. 6 illustrates the shield of FIG. 5 disposed around the loop antenna of FIG. 4.

FIG. 5 shows a conventional shield 28 adapted for disposal around the antennas 20 of FIGS. 1-4. The shield 28 is typically metallic and includes a plurality of longitudinally oriented slots 30. Rubber is deposited inside each slot 30 in the shield 28. An illustration of the shield 28 disposed over the antenna 20 is shown in FIG. 6. The slots 30 allow the electromagnetic energy from the energized antenna 26 to emanate therefrom (in the case of a transmitter 20a) or to be received therein (in the case of a receiver 20b).

Figure 7:
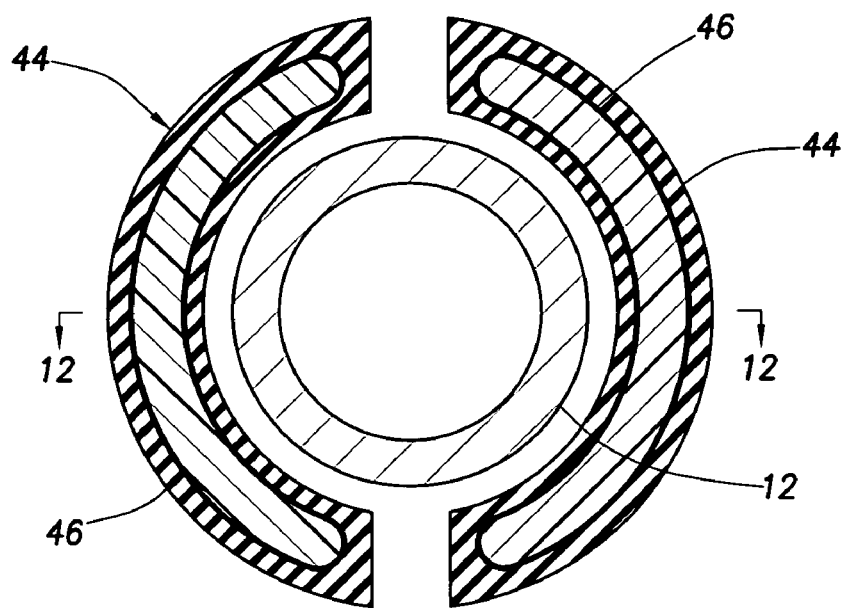
FIG. 7 illustrates a cross section of a drill collar equipped with arcuate shaped members forming an antenna in accord with the invention.

Turning to FIG. 7, a cross-section of an embodiment of the invention is shown. A drill collar 12 is illustrated with two partial ring sections 44 disposed around the collar, each partial ring section 44 being easily placed around a groove or recess in the collar because each partial ring section 44 is "independently formed" with respect to the collar 12. A "partial ring section" is an "arcuate shaped member" or "arcuate shaped section" in view of the fact that each partial ring section is curved in cross sectional shape. As a result, since the partial ring section is independently formed with respect to the drill collar, each partial ring section/arcuate shaped member 44 can be manually and separately placed around the collar 12 (this is a quick and easy procedure). The partial ring sections 44 are preferably rigid and may be formed using a nonconductive material such as fiberglass epoxy or other suitable thermoplastic compounds or resins.

General properties of usable non-conductive materials include: a very high electrical resistivity to minimize electromagnetic losses, rigid mechanical properties to remain dimensionally stable under downhole pressures, a coefficient of thermal expansion similar to that of the drill collar material to remain positional stable, and immunity to water penetration. For high frequency applications, a material with a low magnetic permeability is preferable—typically 1. For low frequency applications, antenna efficiency may be increased using a ferrite material with a large magnetic permeability (10-10,000). It should be understood that ferrite materials can be used in the partial ring sections, in addition to fiberglass epoxy, or in place of fiberglass epoxy or other thermoplastic material. Ferrite materials can have the other electrical properties (high resistivity) and mechanical and thermal properties listed above. Further details of the antenna construction are given below.

The term partial ring section could also comprise, for example, a half cylinder, or it could comprise two curved quad-sections. In fact, the term "partial ring section" could comprise any number of 'curved shaped' sections which, when juxtaposed together, would comprise or constitute a half cylinder. In addition, a partial ring section could also include a section which is not strictly either: a half-cylinder, or a ring, or any other member having a curved shape in cross section. As shown in FIG. 7, an antenna coil 46 is disposed within each of the partial ring sections 44.

FIG. 8 shows the embodiment of FIG. 7 taking a cross section through the drill collar 12 and partial ring section 44 in FIG. 7 along section line 12-12. In FIG. 8, two partial ring sections 44 are shown. Each partial ring section 44 is disposed on and independently formed with respect to the recess 22.

If the drill collar 12 is removed from FIG. 7, and if the cross section 12-12 is taken through the resultant structure in FIG. 7 (with the drill collar removed), the result will be the drawing illustrated in FIG. 9.

The embodiments of the invention shown in FIGS. 7-9 illustrate that it is not necessary or required to wrap the antenna coil 26 around the recess or groove 22 of the drill collar 12 as done with conventional antennas. The antennas 20 of the invention can be separately manufactured relative to the downhole tool. As a result, the antennas 20 can be separately disposed on the drill collar 12 for the purpose of transmitting or receiving electromagnetic energy downhole. Since the antennas 20 can be separately disposed on the collar, it is no longer necessary to ship drill collars to a central manufacturing facility to wrap antennas around the tool.

In the embodiments shown in FIGS. 8 and 9, the partial ring section 44 is a half-cylinder. This half-cylinder partial ring section 44 includes an antenna coil 46, one section of the antenna 46 being the primary coil path 46a and the other section being the return coil path 46b (the antenna coil 46 is shown in cross section in FIG. 14 discussed below). As can be observed from FIGS. 8 and 9, each partial ring section 44 can be manually placed around the recess 22.

With the antennas of the invention, when one or more antennas on the downhole tool need to be repaired, one need only remove the shield (if one is used) from the faulty antenna, manually remove one or both of the old partial ring sections of the faulty antenna (because each partial ring section is independently formed with respect to the tool), manually replace the old partial ring sections with one or two new partial ring sections, and replace the shield.

Figure 10:
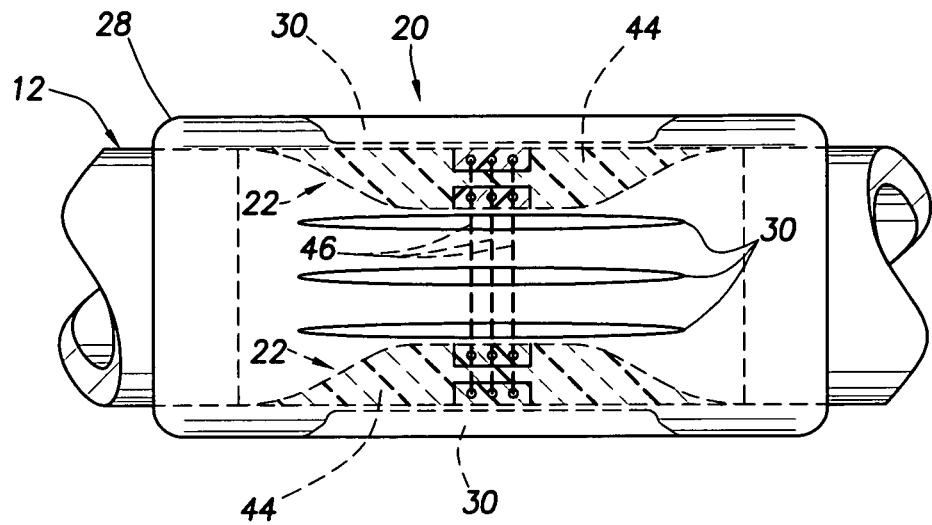
FIG. 10 illustrates the antenna of FIG. 8 with a shield disposed around the antenna in accord with the invention.

FIG. 10 shows an antenna 20 of the invention on a drill collar 12. A pair of partial ring sections 44 have been manually placed around a recess 22 in the collar 12 to form an antenna 20. A shield 28 has also been placed around the two partial ring sections 44. The shield 28 includes a plurality of longitudinally oriented slots 30, each of which have rubber embedded therein. Each partial ring section 44 includes an antenna coil 46, which further includes a primary coil path 46a and a return coil path 46b as shown in FIG. 9.

Figure 11:
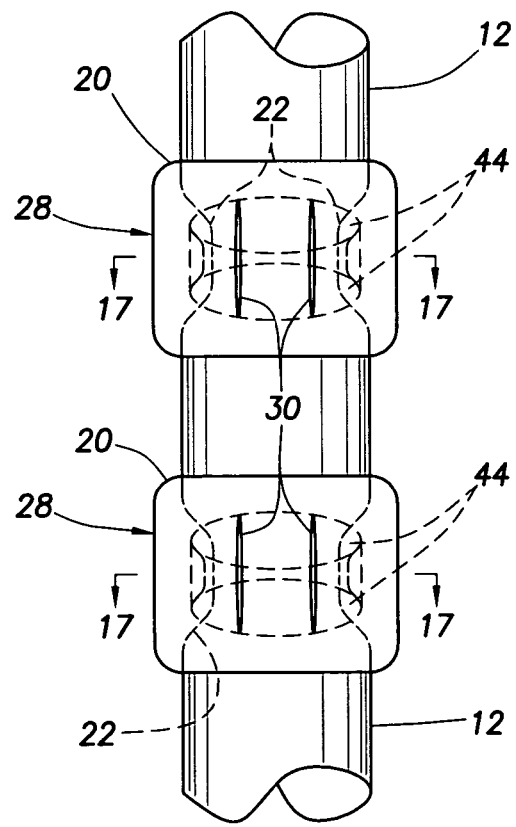
FIG. 11 illustrates a downhole tool having at least two recesses or grooves where, in each recess, two 'partial ring sections' are disposed in the recess and are juxtaposed together to form a 'ring shaped loop antenna' which includes 'at least two antenna coils' embedded therein, each such 'ring shaped loop antenna' being enclosed by a slotted shield in accord with the invention.

FIG. 11 shows a more detailed construction of a drill collar 12 including the antennas 20 of the invention. The drill collar 12 includes two recesses 22 with a pair of partial ring sections 44 placed in each recess. A shield 28 is shown mounted around each pair of partial ring sections 44.

Turning to FIG. 12, a cross-sectional view of each of the antennas 20 on the drill collar 12 of FIG. 11 is taken along section lines 17-17 of FIG. 11. A pair of partial ring sections 44 have been manually placed in the recess 22; that is, a first partial ring section 44a has been manually placed around one-half of the recess 22 in the collar 12 and a second partial ring section 44b has been manually placed around the other one-half of the recess 22 in the collar 12. A shield 28 is placed around the two partial ring sections 44, the shield being in two parts: a first half-section 28a of shield 28 enclosing the first partial ring section 44a, and a second half-section 28b of shield 28 enclosing the second partial ring section 44b.

Figure 13:
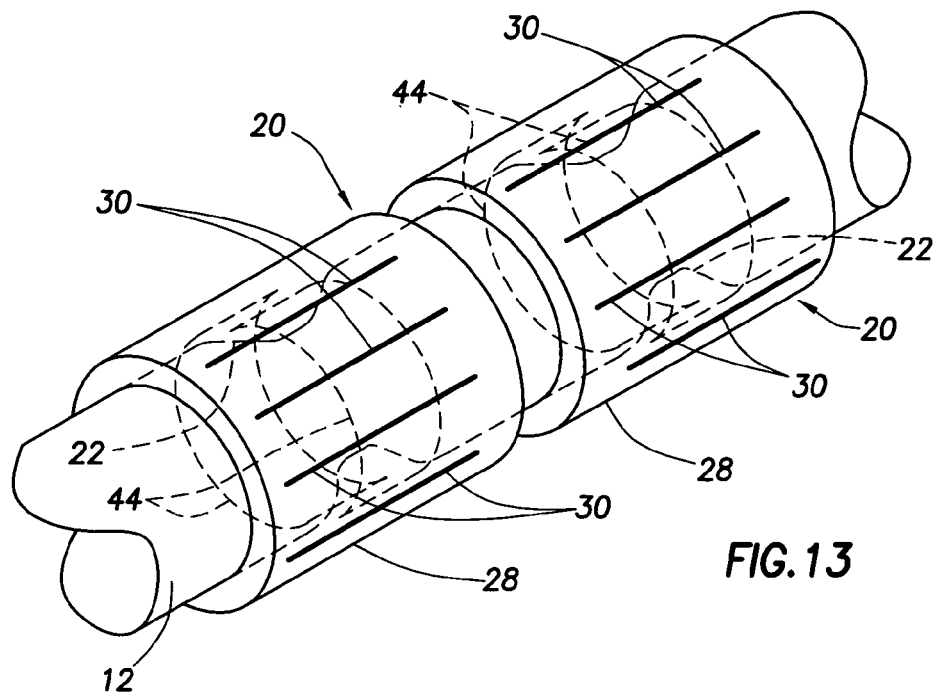
FIG. 13 illustrates a three-dimensional view of the downhole tool of FIG. 11.

FIG. 13 shows another view of the antennas 20 of the invention on a drill collar 12. A pair of partial ring sections 44 are disposed in each of the recesses 22 in the collar 12. Each partial ring section 44 includes an antenna coil 46 as shown in FIG. 9. A slotted shield 28 is disposed around each of the partial ring sections 44.

Figure 14:
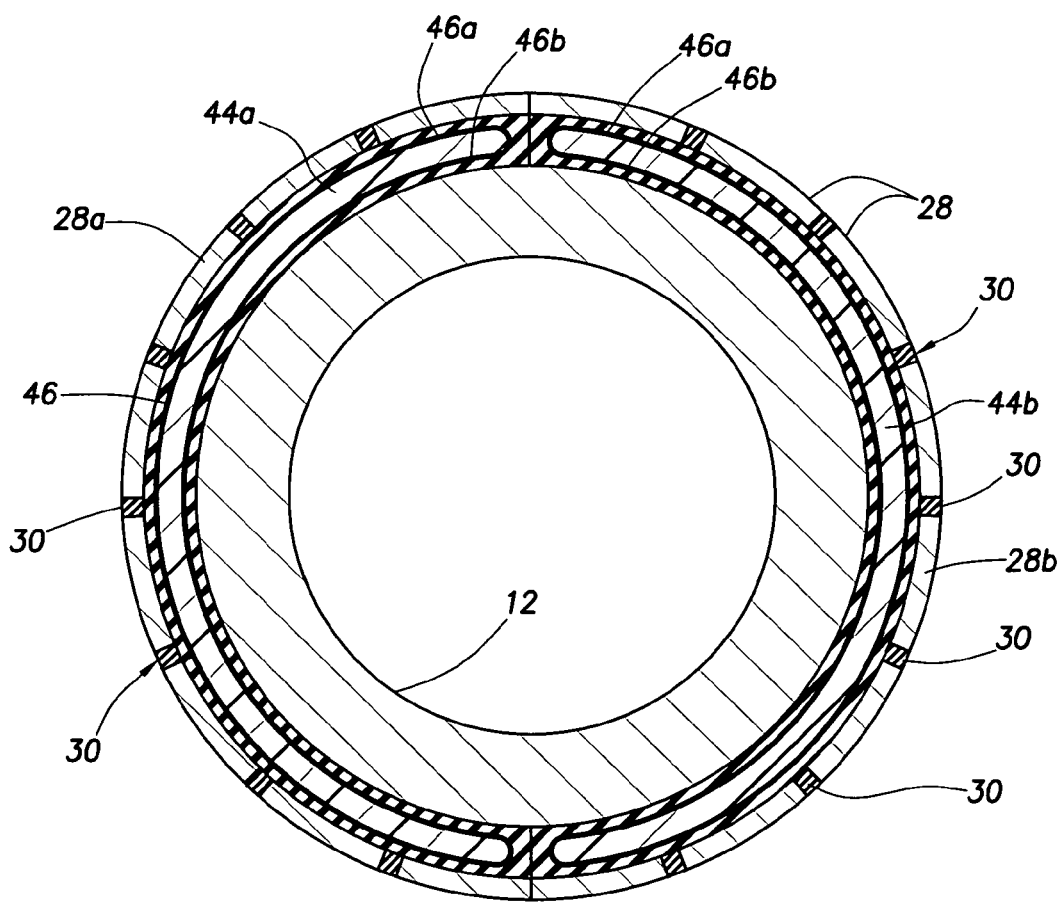

FIG. 14 is a cross-sectional view in a plane perpendicular to the axis of the drill collar of FIG. 12, illustrating the partial ring sections 44 and shield 28. Recall from the above discussion with reference to FIG. 12 that a first partial ring section 44a is enclosed by a first half-section 28a of the shield 28, and a second partial ring section 44b is enclosed by a second half-section 28b of the shield 28. In the first partial ring section 44a, an antenna coil 46 is embedded in fiberglass epoxy, and the antenna 46 includes a primary coil path 46a and the return coil path 46b. In the second partial ring section 44b, an antenna coil 46 is embedded in fiberglass epoxy, the antenna 46 including a primary coil path 46a and the return coil path 46b. It should be understood that partial ring sections 44a and 44b could contain a ferrite material in addition to the fiberglass epoxy, or could be made of ferrite. As mentioned before, this could be advantageous at low operating frequencies.

FIG. 15 shows the primary coil path 46a and return coil path 46b in the first and second partial ring sections 44a and 44b of antenna 20 in FIG. 14. Feed wires 50 are connected to the primary and return paths in the first partial ring section 44a, and feed wires 52 are connected to the primary and return paths in the second partial ring section 44b. The feed wires 50 and 52 are preferably connected in series or in parallel so that the currents flow in the directions indicated in FIG. 15. This causes the magnetic fields produced by the transmitter (for example) to be parallel. For the purpose of illustration, only one turn is shown. However, the coil could contain any number of turns depending on the operating frequency.

Other views of the partial ring section 44 embodiments of the invention are shown in FIGS. 16a and 16b. In FIG. 16a, the antenna is embedded in a base or seat that consists of a coil form 54 disposed between the primary and return coil paths 46a and 46b. Coil form 54 could be made of fiberglass epoxy, a thermoplastic, and could also contain a ferrite material or be made entirely of a ferrite material. A rubber overmold 56 completely encompasses the exterior of the antenna 46. FIG. 16b illustrates a cross sectional view of the partial ring section 44 of FIG. 16a, taken along section lines 20b-20b of FIG. 16a. FIG. 16b shows the coil form 54. The coil form 54 provides a base or seat for the primary and return coil paths. The rubber overmold 56 is also shown encompassing the antenna coil 46a/46b.

Figure 17:
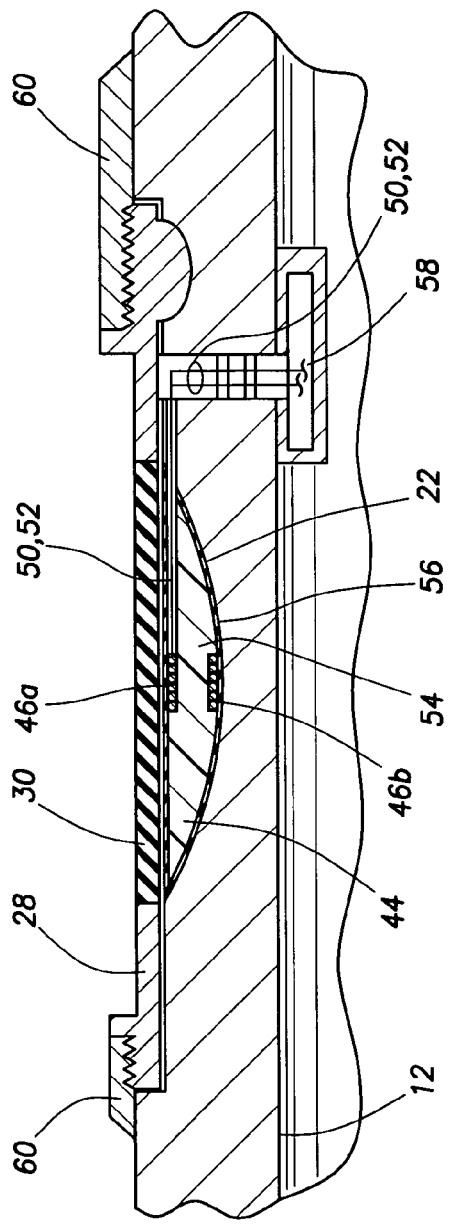
FIG. 17 illustrates the construction of the 'partial ring section' disposed in a recess in a drill collar with a shield disposed around the partial ring section, the shield being threadedly secured to the collar by a wearband and threaded lock ring.

FIG. 17 shows a cross-sectional view taken through the wall of the drill collar 12. This cross-sectional view is in a plane that is parallel to, and intersects, the axis of the drill collar 12. The partial ring section 44 includes the primary and return coil paths 46a, 46b sitting inside the seat provided by the coil form 54, and the rubber overmold completely encompasses the antenna coil 46a/46b. Feed thru wires 50/52 connect to the antenna coil 46a/46b, the feed thru wires 50/52 being connected, on the other end, to pocket electronics 58. As known in the art, the electronics 58 are adapted to energize the antenna coil 46a/46b with alternating current for transmitting electromagnetic energy through the shield 28 slots 30 or to receive signals responsive to the receipt of electromagnetic energy through the shield.

The shield 28, with rubber filled slots 30, is securely fixed to the drill collar 12, covering the partial ring section 44, by a threaded lock ring 60. Since each end of the shield 28 is threaded, the threads on the shield mate with the threads on the lock ring 60 on both ends of the shield 28. It will be appreciated by those skilled in the art that any suitable technique for fastening or securing the shield 28 may be used to implement the invention. For example, a number of screws inserted through the shield and into the drill collar can be used to secure the shield to the drill collar.

In addition to axial and diagonal antenna coils, transverse antenna coils can also be implemented with the partial ring sections 44 of the invention as illustrated in FIGS. 18-21.

Figure 18A:
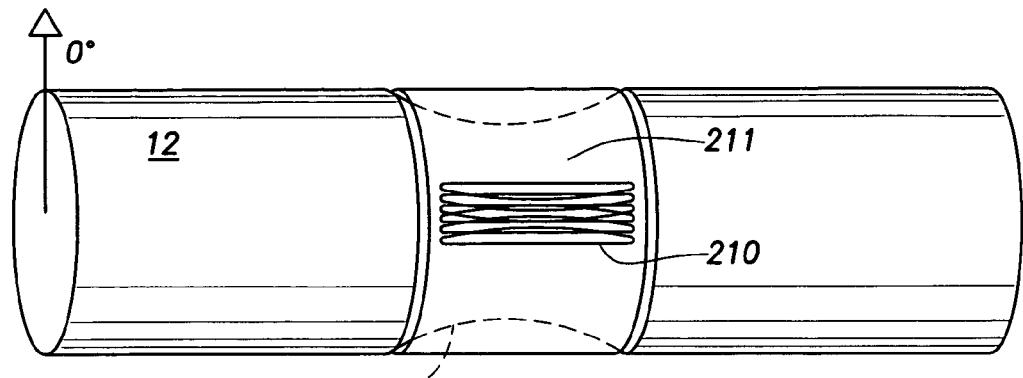
FIGS. 18a illustrates a partial ring section including a transverse antenna configuration disposed on a downhole tool in accord with the invention.
Figure 18B:
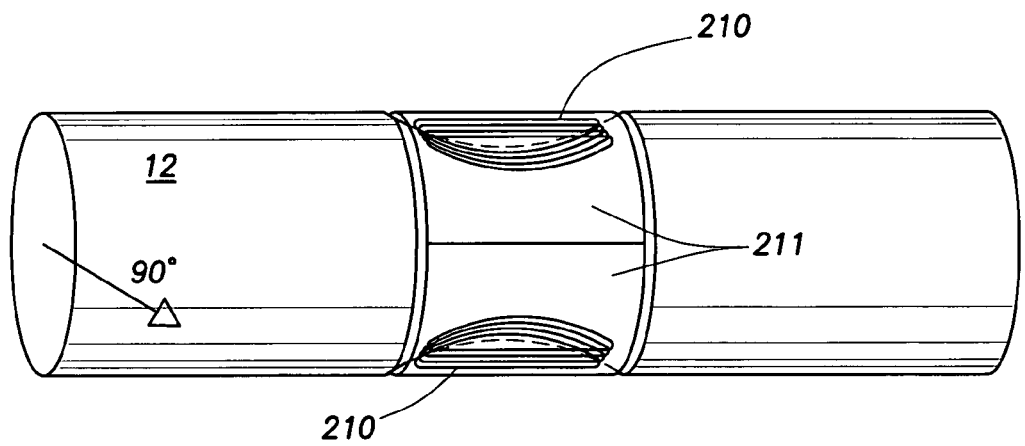
FIG. 18b illustrates the embodiment of FIG. 18a rotated by 90 degrees, showing two partial ring sections.
Figure 18C:
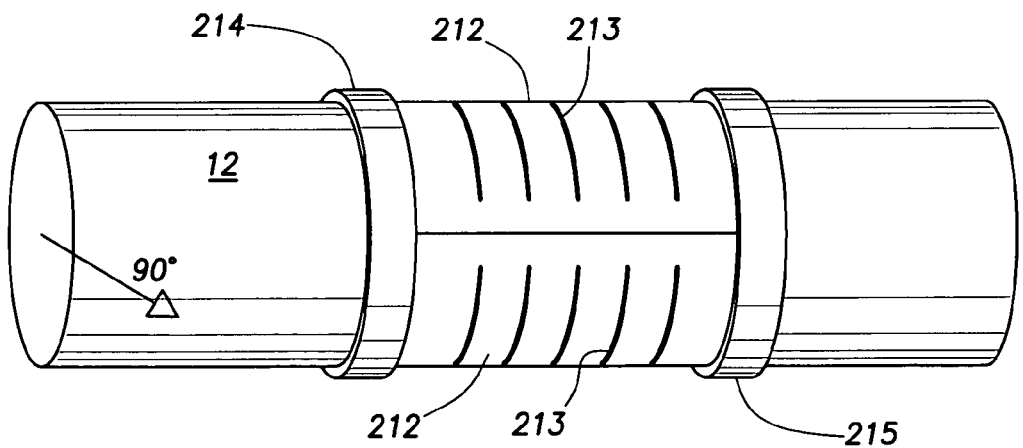
FIG. 18c illustrates the embodiments of FIGS. 18a and 18b with a shield structure disposed over the partial ring sections, showing the relationship between the azimuthal shield slots and the transverse coils.

FIG. 18a shows a drill collar 12 with a partial ring section 211 containing a transverse antenna coil 210, but without a shield attached to the collar. The transverse antenna coil 210 is formed by one or more loops of wire where the wire loop lies in a plane essentially parallel to the axis of the collar. In FIG. 18b, the embodiment of FIG. 18a is rotated by 90 degrees, and it shows two partial ring sections 211, each containing a transverse antenna coil 210. There are two transverse antenna coils 210, located on opposite sides of the drill collar 12. In FIG. 18c, a metal shield has been installed over the partial ring sections 211. The viewpoint is the same in FIGS. 18b and 18c to illustrate the relationship between the slots in the shield 212 and the transverse antenna coils 210. The shield slots 213 are azimuthal and located over the transverse coils 210. The shield is comprised of two half shells 212, that are held in place with wear-bands 214 and 215.

Figure 19B:
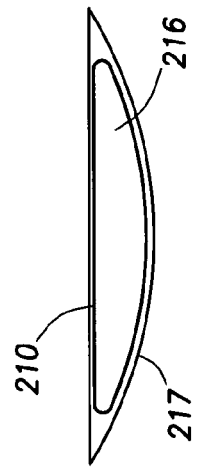
FIG. 19b is a magnified cross-sectional view of partial ring section of FIG. 19a at the location of the coil.
Figure 19A:
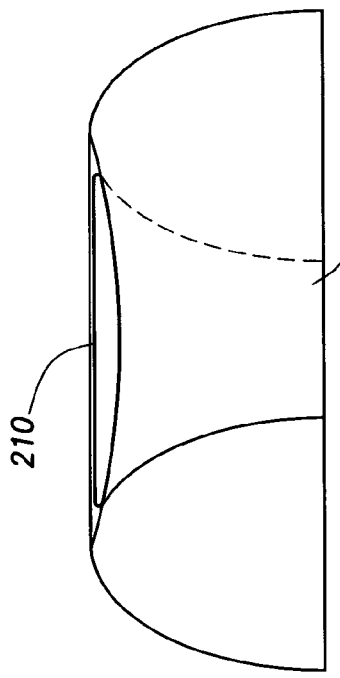
FIG. 19a illustrates a partial ring section with one loop of a transverse coil in accord with the invention.

FIG. 19a shows a partial ring section 211 with one loop of a transverse coil 210. The partial ring section contains a rigid, insulating coil form 216, which has a groove to accept the wire. A magnified cross-sectional view of the partial ring section 211 at the location of the coil 210 is shown in FIG. 19b. During the fabrication, the coil 210 is wrapped around the coil form 216, and then covered with a layer of rubber 217 to provide a waterproof barrier.

FIG. 20 shows a cross-sectional view taken through the wall of the drill collar 12. This cross-sectional view is in a plane that is parallel to, and intersects, the axis of the drill collar. The drill collar wall contains recess 22, in which the partial ring section 211 is located. The transverse antenna coil 210 is connected to electronics 220 located inside the drill collar by feedwires 222 and pressure bulkhead feed-through 219. As the electronics are typically maintained at atmospheric pressure inside the drill collar, the pressure bulkhead feed-through 219 contains o-rings. The partial ring section 211 is held in the recess 22 by the half shield 212. The half shield is secured to the drill collar with wearbands 214 and 215. The wearbands are circular and thread onto the two half shields 212. A key 221 orients a half shield with respect to the drill collar 12, and prevents it from rotating or from moving axially. The half shield 212 has several rubber filled slots 213.

Figure 21:
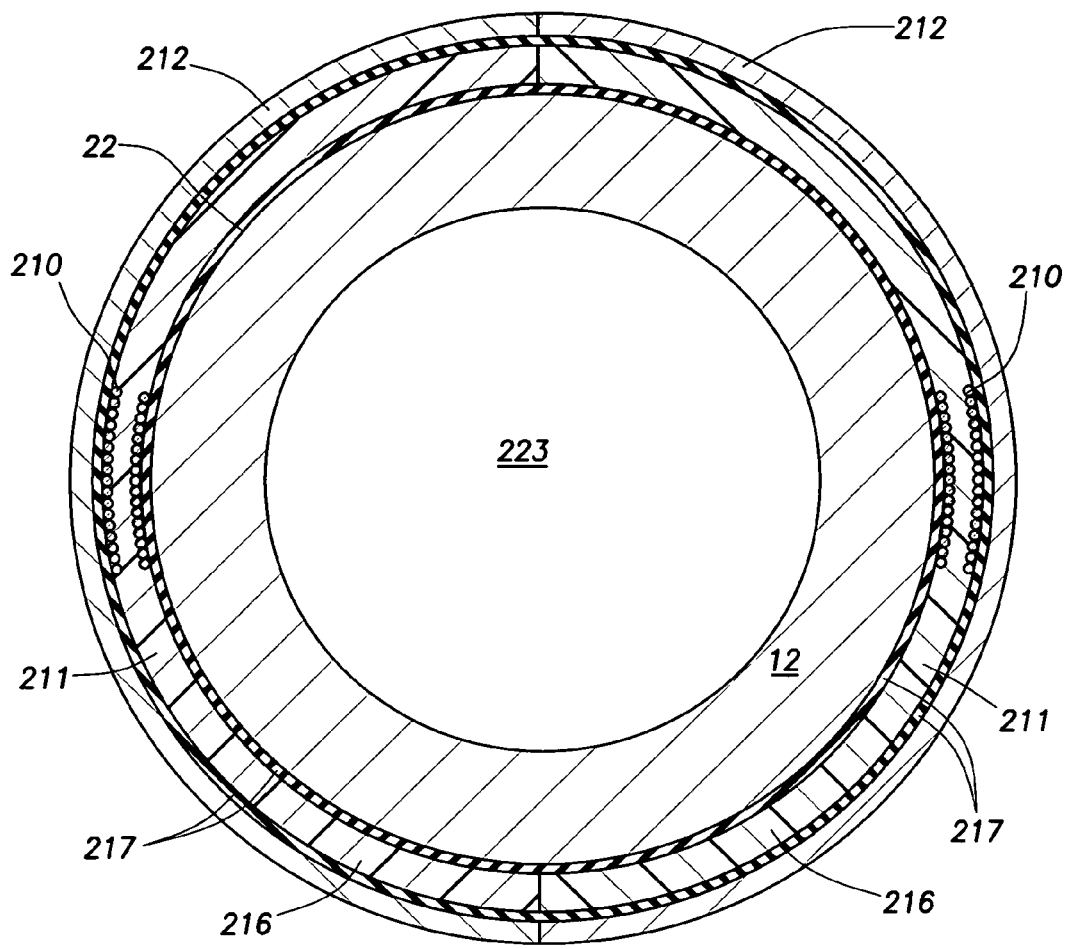
FIG. 21 is a cross-sectional view showing two partial ring sections disposed on a drill collar, each section including a transverse coil in accord with the invention.

FIG. 21 is a cross-sectional view in a plane perpendicular to the axis of the drill collar 12 and passing through the antenna. The wall of the drill collar 12 has a recess 22 containing two partial ring sections 211. Each partial ring section 211 has transverse coil 210, wrapped on a coil form 216, and covered with rubber 217. Half shields 212 cover the partial ring sections 211 and protect them from damage during drilling. The interior 223 of the drill collar contains electronics inside a pressure vessel, and also provides a passage for mud flow.

FIG. 22 shows another embodiment of the invention. Partial ring sections 44 are disposed in the recess 22 in the drill collar 12. However, the antenna coils embedded in the partial ring section 44 are diagonal antenna coils 62. That is, the coil paths 46*a*, 46*b* are disposed at an angle with respect to the drill collar 12 axis.

Figure 23:
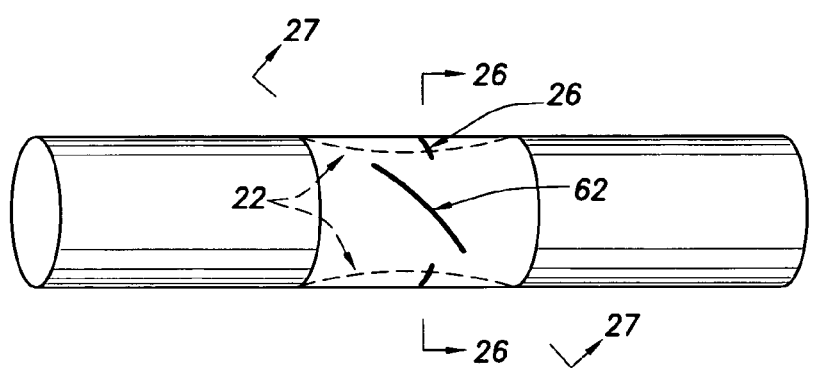
FIG. 23 illustrates the diagonal antenna coil configuration of FIG. 22 in combination with an axial antenna coil configuration in accord with the invention.

FIG. 23 shows another embodiment of the invention. In this embodiment, multiple coils, both diagonal (as in FIG. 22) and axial (as in FIG. 10), are implemented. Two axial antenna coils 26 are located on opposite sides of the recess 22. However, in addition to the two axial coils 26, two diagonal coils 62 are also located on opposite sides of the recess 22, at 90 degrees with respect to the two axial coils 26.

Figure 25:
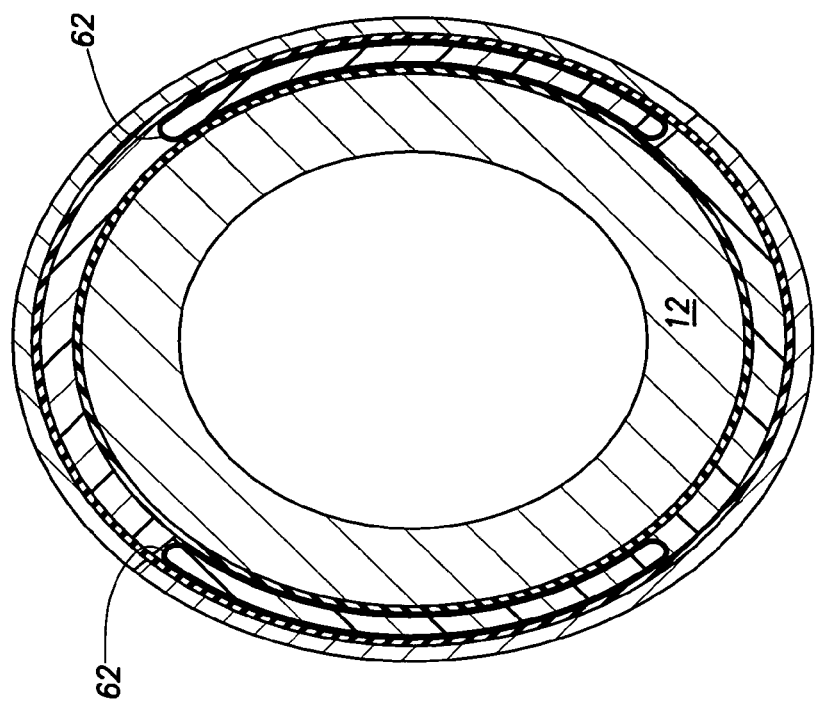
FIG. 25 is a cross-sectional view of the antenna configuration of FIG. 23 taken along section lines 27-27 of FIG. 23.
Figure 24:
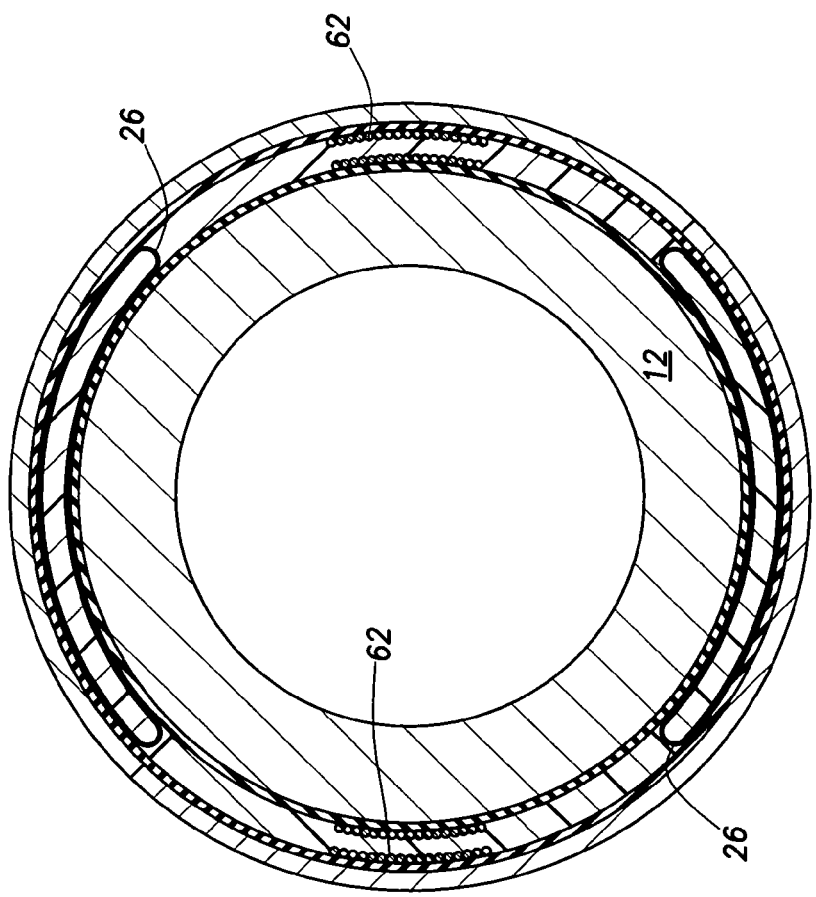
FIG. 24 is a cross-sectional view of the antenna configuration of FIG. 23 taken along section lines 26-26 of FIG. 23.

FIG. 24 shows a sectional view of the antenna coil in FIG. 23, taken along section lines 26-26 of FIG. 23. In FIG. 25, another sectional view of the antenna coil of FIG. 23 is illustrated, taken along section lines 27-27 of FIG. 23. Note that the drill collar and diagonal coils are elliptical in this sectional view. The advantage here is that the axial coils are located in the center of the recess 22, improving the antenna efficiency and shortening its length. The relative areas and the number of turns for diagonal and axial coils can also be optimized for directionality and efficiency. Because the shields (not shown) are aligned with the collar by keys, the azimuthal orientation of the slot pattern is assured. Note also that transverse coils of the invention could be used in place of the diagonal coils, with the relative areas and number of turns again optimized for efficiency and directivity (not shown).

For the purposes of this specification it will be clearly understood that the word "comprising" means "including but not limited to", and that the word "comprises" has a corresponding meaning.

While the invention has been described with respect to a limited number of embodiments, those skilled in the art will appreciate that other embodiments can be devised which do not depart from the scope of the invention as disclosed herein. For example, embodiments of the invention may be implemented without shields, or the shields may be formed of non-metallic or nonconductive materials. Additional embodiments of the invention may also comprise a single partial ring section or a plurality of such ring sections in any one recess on the downhole tool.

What is claimed is:

1. An antenna for use in a downhole tool, comprising:
    a first partial ring section disposed within a portion of a recess in and extending circumferentially around a tubular, the first partial ring section having two ends;
    a first coil disposed on or in the first partial ring section, the first coil providing a current path that extends less than about 180 degrees about the tubular;
    a second partial ring section disposed within a different portion of the recess and having two ends; and
    a second coil disposed on or in the second partial ring section, the second coil providing a current path that extends less than about 180 degrees about the tubular;
    wherein the ring sections are removeably secured to the tubular.

2. The antenna of claim 1, further comprising a rubber layer disposed over the first and/or second partial ring sections.

3. The antenna of claim 1, wherein each of the coils produces an axially directed dipole moment relative to a longitudinal axis of the tubular.

4. The antenna of claim 1, wherein each of the coils produces a diagonally directed dipole moment relative to a longitudinal axis of the tubular.

5. The antenna of claim 1, wherein each of the coils produces a transversely directed dipole moment relative to a longitudinal axis of the tubular.

6. The antenna of claim 1, wherein the first coil produces an axially directed dipole moment relative to a longitudinal axis of the tubular and the second coil produces a diagonally directed dipole moment relative to the longitudinal axis of the tubular.

7. The antenna of claim 1, wherein the first coil produces an axially directed dipole moment relative to a longitudinal axis of the tubular and the second coil produces a transversely directed dipole moment relative to the longitudinal axis of the tubular.

8. The antenna of claim 1, wherein the first coil produces a diagonally directed dipole moment relative to a longitudinal axis of the tubular and the second coil produces a transversely directed dipole moment relative to the longitudinal axis of the tubular.

9. The antenna of claim 1, further comprising a plurality of partial ring sections disposed within the recess, each partial ring section having a coil disposed thereon or therein, each coil providing a current path that extends less than about 180 degrees about the tubular.

10. The antenna of claim 9, wherein:
    at least one coil produces a diagonally directed dipole moment relative to a longitudinal axis of the tubular;
    at least one coil produces a transversely directed dipole moment relative to the longitudinal axis of the tubular; and
    at least one coil produces an axially directed dipole moment relative to the longitudinal axis of the tubular.

11. The antenna of claim 9, wherein:
    at least one coil produces a first transversely directed dipole moment relative to a longitudinal axis of the tubular;
    at least one coil produces a second transversely directed dipole moment relative to the longitudinal axis of the tubular that is orthogonal to the first transversely directed dipole moment; and
    at least one coil produces an axially directed dipole moment relative to the longitudinal axis of the tubular.

12. The antenna of claim 9, wherein the partial ring sections are made from nonconductive materials.

13. The antenna of claim 12, wherein each of the partial ring sections has a rubber layer disposed over the nonconductive materials.

14. The antenna of claim 1, wherein the first partial ring section and the second partial ring section are made from nonconductive materials.

15. The antenna of claim 1, further comprising a shield disposed over each partial ring section.

16. The antenna of claim 1, wherein the tubular comprises one of a drill collar or a wireline tool.

17. The antenna of claim 1, further comprising a plurality of coils disposed on or in at least one of the partial ring sections, wherein any one of the coils produces a dipole moment that is axial, transverse, or diagonal relative to a longitudinal axis of the tubular.

18. A method to repair or reconfigure an antenna disposed on a wellbore tool, comprising:

removing one or more partial ring sections disposed within a recess in and extending circumferentially around a tubular, each of the one or more partial ring sections having two ends and one or more coils disposed on or in the partial ring section, each of the one or more coils providing a current path that extends less than about 180 degrees about the tubular;

removeably securing one or more replacement partial ring sections within the recess, each of the one or more replacement partial ring sections having two ends and one or more coils disposed on or in the replacement partial ring section, each of the one or more coils providing a current path that extends less than about 180 degrees about the tubular; and coupling an electrical source to one or more of the one or more coils disposed on or in the one or more replacement partial ring sections.

19. The method of claim 18, wherein the coils are linked with electronic means adapted to energize the coils or receive electromagnetic signals from the coils.

20. The method of claim 18, further comprising disposing a shield over the replacement partial ring sections.

21. The method of claim 18, wherein the wellbore tool comprises one of a drill collar or a wireline tool.

* * * * *